United States Patent
Lee et al.

(10) Patent No.: US 7,864,786 B2
(45) Date of Patent: Jan. 4, 2011

(54) REPEATER APPARATUS FOR SUPPORTING A PLURALITY OF PROTOCOLS, AND A METHOD FOR CONTROLLING PROTOCOL CONVERSION IN THE REPEATER APPARATUS

(75) Inventors: Jong-Hun Lee, Suwon-si (KR); Young-Seok Kim, Seongnam-si (KR); Do-In Choi, Yongin-si (KR)

(73) Assignee: Samsung Electronics Co., Ltd., Yeongtong-Gu, Suwon-Si, Gyeonggi-Do (KR)

( * ) Notice: Subject to any disclaimer, the term of this patent is extended or adjusted under 35 U.S.C. 154(b) by 1179 days.

(21) Appl. No.: 11/190,415

(22) Filed: Jul. 27, 2005

(65) Prior Publication Data

US 2006/0045106 A1 Mar. 2, 2006

(30) Foreign Application Priority Data

Sep. 2, 2004 (KR) ...................... 10-2004-0069965

(51) Int. Cl.
*H04L 12/28* (2006.01)
*H04L 12/56* (2006.01)
*H04J 3/16* (2006.01)
*H04J 3/22* (2006.01)

(52) U.S. Cl. ...................... 370/401; 370/466; 370/467; 341/50

(58) Field of Classification Search ................. 370/401, 370/466, 367
See application file for complete search history.

(56) References Cited

U.S. PATENT DOCUMENTS 6,324,178 B1 * 11/2001 Lo et al. ...................... 370/392
6,502,997 B1 * 1/2003 Lee et al. ...................... 385/88
6,690,304 B1 * 2/2004 Shirokura et al. ............. 341/50
6,707,825 B1 * 3/2004 Turner et al. ................ 370/467
6,956,828 B2 * 10/2005 Simard et al. ............... 370/260
2001/0053155 A1 * 12/2001 DeNies et al. ............... 370/466

(Continued)

FOREIGN PATENT DOCUMENTS

EP 1361719 A1 5/2002

(Continued)

*Primary Examiner*—Huy D Vu
*Assistant Examiner*—Andrew Oh
(74) *Attorney, Agent, or Firm*—Cha & Reiter, LLC

(57) ABSTRACT

Disclosed is an Ethernet-IEEE 1394 repeater apparatus as a network transmission equipment for connecting between networks having the same or different protocols is disclosed. The apparatus includes a first protocol physical element for performing a modulation/demodulation process of a first protocol data; a second protocol physical element for performing a modulation/demodulation process of a second protocol data; an output interface for outputting the data through an output transmission, media; a first switch for switching the data input to one of the first protocol physical element and the second protocol physical element; a second switch, tuned with the first switch, for switching an output path to one of the first protocol physical element and the second protocol physical element, the output path being connected to the output interface; and a control unit for receiving a protocol information of data sent from one of the first protocol physical element and the second protocol physical element to control the first switch and the second switch based on the received protocol information, the one being selectively connected based on the current switching condition.

22 Claims, 5 Drawing Sheets

U.S. PATENT DOCUMENTS

| | | | |
|---|---|---|---|
| 2002/0049803 A1* | 4/2002 | Bandhole et al. | 709/104 |
| 2002/0054589 A1* | 5/2002 | Ethridge et al. | 370/352 |
| 2002/0136225 A1 | 9/2002 | Joy et al. | |
| 2002/0191588 A1* | 12/2002 | Personick | 370/352 |
| 2003/0039260 A1 | 2/2003 | Fujisawa | |
| 2003/0133476 A1 | 7/2003 | Stone et al. | |
| 2003/0174729 A1* | 9/2003 | Heink et al. | 370/466 |
| 2003/0202509 A1* | 10/2003 | Miyano et al. | 370/367 |
| 2004/0066790 A1* | 4/2004 | Valavi et al. | 370/419 |
| 2004/0090987 A1* | 5/2004 | Doidge et al. | 370/467 |
| 2004/0109460 A1* | 6/2004 | Banks et al. | 370/401 |
| 2004/0174887 A1* | 9/2004 | Lee | 370/395.53 |

FOREIGN PATENT DOCUMENTS

| | | |
|---|---|---|
| EP | 1326403 A1 | 1/2003 |
| EP | 1361713 A1 | 11/2003 |
| JP | 2000-151676 | 5/2000 |
| JP | 2001-156872 | 6/2001 |

* cited by examiner

REPEATER APPARATUS FOR SUPPORTING A PLURALITY OF PROTOCOLS, AND A METHOD FOR CONTROLLING PROTOCOL CONVERSION IN THE REPEATER APPARATUS

CLAIM OF PRIORITY

This application claims priority to an application entitled "REPEATER APPARATUS FOR SUPPORTING A PLURALITY OF PROTOCOLS, AND A METHOD FOR CONTROLLING PROTOCOL CONVERSION IN THE REPEATER APPARATUS," filed in the Korean Intellectual Property Office on Sep. 2, 2004 and assigned Serial No. 2004-69965, the contents of which are hereby incorporated by reference.

BACKGROUND OF THE INVENTION

1. Field of the Invention

The present invention relates to a network transmission equipment, more particularly to a repeater complying the IEEE 1394 and Ethernet protocols.

2. Description of the Related Art

The IEEE 1394 is a protocol provides a maximum rate of 400 Mbps and a maximum transmission distance of 100 m in realtime. The broadcasting data and anisotropy data such as Internet data can be transmitted simultaneously in this protocol. Recently, the IEEE 1394 tends to prevail even in field of Internet data transmission because it is possible to transmit Internet Protocol (IP) data through IEEE 1394 LLC and PHY instead of Ethernet link layers, based on the use of the internet protocol (IP)-over-1394 technique. In the IEEE 1394, however, the repeaters are required for extending the transmission distance, as the IEEE 1394 has a limited standard 4.5 m transmission distance or range.

The repeater is not an internetworking equipment because the repeater operates in a physical layer of OSI reference model and substantially extends the segments of individual networks. Therefore, cables connected by the repeater are regarded as being a part of the same physical network. The repeater, which does not drive any software, only amplifies initial signals without affecting any traffic of the network.

FIGS. 1a and 1b illustrate the structures of an Ethernet repeater and an IEEE 1394 repeater according to the prior art.

Referring to FIG. 1a, the conventional Ethernet repeater allows not only the transmission distance to be extended but also increase the numbers of transmission port in order to effectively transmit Ethernet data. In the conventional Ethernet repeater, an unshielded twisted pair (UTP) cat. 5/5E is used for a transmission through which the Ethernet data is input to an input interface 101.

In operation, an input interface 101 sends incoming Ethernet data to a first converter 102 in which the Ethernet data are transferred to an Ethernet physical element 103. Then, an Ethernet physical element 103 performs modulation/demodulation processes of the Ethernet data to be transmitted. The processed Ethernet data are transmitted to an output interface 105 via a second converter 104. Finally, the output interface 105 transmits the Ethernet data through the UTP cat. 5/5 E. In this case, the transmission rates of the Ethernet data may be, for example, 10/100 Mbps and 1 Gbps. The transmission distances may be, for example, 100 mm, when the UTP is used for the transmission media.

In the conventional Ethernet repeater, if the abnormal voltage is inadvertently applied to the transmission media, the internal chips such as the Ethernet physical element 103, etc. may be damaged. The first converter 102 and the second converter 104 can isolate the Ethernet physical element 103, etc. from the transmission media, if necessary, in order to prevent possible damage caused by the abnormal voltage.

Referring to FIG. 1b, the conventional IEEE 1394 repeater also allows not only the transmission distance to be extended but also the number of the transmission ports to be increased in order to effectively transmit the IEEE 1394 data. Here, an unshielded twisted pair (UTP) cat. 5/5E is used as a transmission media through which the IEEE 1394 data is input to an input interface 101. The input interface 101 sends the received IEEE 1394 data to the first converter 102 in which the IEEE 1394 data are transferred to an IEEE 1394 physical unit 204. Then, the IEEE 1394 physical unit 204 performs modulation/demodulation processes of the IEEE 1394 data to be transmitted. The processed IEEE 1394 data are sent to the output interface 105 via the second converter 104. Finally, the output interface 105 transmits the IEEE 1394 data through the UTP cat. 5/5 E. In this case, the transmission rates of the IEEE 1394 data may be, for example, 100 Mbps 200 Mbps, 400 Mbps, 800 Mbps and 3.2 Gbps. The transmission distance may be, for example, 100 mm, when the UTP is used for the transmission media.

Similarly in the conventional IEEE 1394 repeater shown in FIG. 1b, if the abnormal voltage is applied to the transmission media, the internal chips such as the IEEE 1394 physical unit 204, etc. may be damaged. The first converter 102 and the second converter 104 can isolate the IEEE 1394 physical unit 204, etc. from the transmission media, if necessary, in order to prevent possible damage caused by the abnormal voltage.

The IEEE 1394 physical unit 204 further includes a first level converter 106, a second level converter 108, and an IEEE 1394 physical element 107. The modulation and the demodulation processes are basic performances of the IEEE 1394 physical unit 204. To this end, the first level converter 106 and the second level converter 108 changes signal voltage levels based on the variation of the transmission media. Specifically, the IEEE 1394 may use STP, UTP, or Optical fiber as its transmission media. The input signals, which input and output to and from the physical element, vary in the signal voltage level in accordance with the transmission media types. The signal voltage levels of the STP and the optical fiber are not identical to that of the UTP. Generally, the IEEE physical element 107 uses a signal voltage for the STP and the optical fiber. Therefore, if UTP is used for the IEEE physical element 107, then it is required to change the used signal voltage level. For this operation, the first level converter 106 and the second level converter 108 are necessary to convert or change the input signal voltage level.

As shown in FIGS. 1a and 1b, both the Ethernet repeater and the IEEE 1394 repeater use the UTP cat. 5 as the transmission media. Recently, an apparatus having both an Ethernet LAN card and an IEEE 1394 card mounted therein has been commercially available and becoming popular. In this environment, the user must use both the Ethernet repeater and the IEEE 1394 repeater separated from each other. Therefore, the conventional repeaters have drawbacks in that the Ethernet repeater and the IEEE 1394 repeater, which are separated with each other, takes too much space and the cost is high. Accordingly, there has been demand for a technique of combining both the Ethernet repeater and the IEEE 1394 repeater together and a technique of converting the transmission data protocol to the proper output protocol through the repeater by using the conversion functions of the Ethernet and IEEE 1394 protocols.

SUMMARY OF THE INVENTION

Accordingly, the present invention has been made to solve the above-mentioned problems occurring in the prior art and provides additional advantages, by providing a single Ethernet-IEEE 1394 repeater and a method for controlling a protocol conversion thereof, The protocol conversion according to the present invention can be performed to operate the single repeater which combines therein an Ethernet repeater function with an IEEE 1394 repeater function.

Another aspect of the present invention is to provide an Ethernet-IEEE 1394 repeater and a method for controlling protocol conversion thereof in which various input protocols can be properly processed by recognizing and automatically switching the protocols.

In one embodiment, there is provided a repeater apparatus for supporting a plurality of protocol including a first protocol and a second protocol which use the same transmission media. The repeater apparatus includes an input interface through which data are input from transmission media; a first protocol physical element for performing modulation/demodulation processes of a first protocol data to be transmitted; a second protocol physical element for performing modulation/demodulation processes of a second protocol data to be transmitted; an output interface for outputting the data through an output transmission media; a first switch for switching the data input to the input interface to one of the first protocol physical element and the second protocol physical element; a second switch, tuned with the first switch, for switching an output path to one of the first protocol physical element and the second protocol physical element, the output path being coupled to the output interface; and a control unit for receiving a protocol information of data sent from one of the first protocol physical element and the second protocol physical element to control the first switch and the second switch based on the received protocol information, the one physical element being selectively connected based on the current switching condition of the physical element.

According another embodiment, there is provided a repeater apparatus for supporting a plurality of protocol including a first protocol and a second protocol which use the same transmission media. The repeater apparatus includes an input interface for inputting therein data through an input transmission media; a first protocol element for processing a first protocol data to be transmitted; a second protocol element for processing a second protocol data to be transmitted; an output interface for outputting the data through an output transmission media; a first switch for switching the data input to the input interface to one of the first protocol element and the second protocol element; a second switch for switching an output path to one of the first protocol element and the second protocol element, the output path being coupled to the output interface; a mode monitor, coupled to the output interface, for monitoring a protocol (output protocol) used in the output transmission media; and a control unit for receiving a protocol information of data (input data) sent from one of the first protocol element and the second protocol element, confirming an input protocol based on the protocol information of the input data, and confirming the output protocol monitored by the mode monitor to control the first switch and the second switch based on the first and the second protocol information, wherein if the input protocol and the output protocol are not identical to each other, the control unit performs protocol conversion control.

According yet another embodiment of the present invention, there is provided a method for controlling protocol conversion in a repeater apparatus having a first and a second processors for supporting a plurality of protocols. The method including a first step for monitoring an output protocol used in a transmission media connected to an output terminal of the repeater apparatus; a second step for determining if the monitored output protocol and an input protocol of input data are identical; a third step for connecting the input data to one of the first protocol processor and the second protocol processor based on the output protocol, if the output protocol and the input protocol are identical to each other according to the determination of the second step; a fourth step for connecting the input data to the first protocol processor or the second protocol processor based on the input protocol, and connecting the output data from one of the first protocol processor and the second protocol processor to the output terminal based on the output protocol, if the output protocol and the input protocol are not identical to each other according to the determination of the second step; a fifth step for connecting the input data to the protocol processor corresponding to the input protocol and processing the input data by a physical layer process and a MAC process to decapsulate the processed data, after finishing the connection of the fourth step; and a sixth step for connecting the decapsulated data to the protocol processor corresponding to the output protocol, and capsulating the data with the output protocol to transfer the capsulated data to the output terminal.

BRIEF DESCRIPTION OF THE DRAWINGS

The above features and advantages of the present invention will be more apparent from the following detailed description taken in conjunction with the accompanying drawings, in which.

DETAILED DESCRIPTION

Figure 1A:
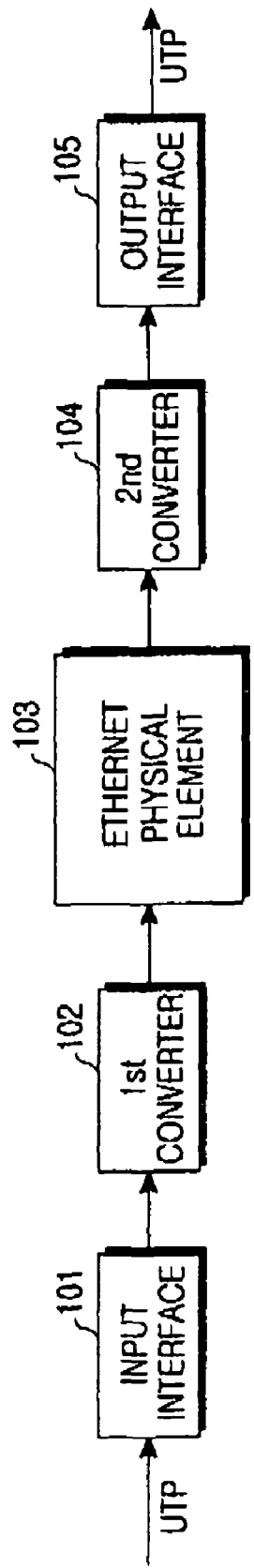
FIGS. 1a and 1b illustrate the structures of an Ethernet repeater and an IEEE 1394 repeater according to prior arts.
Figure 1B:
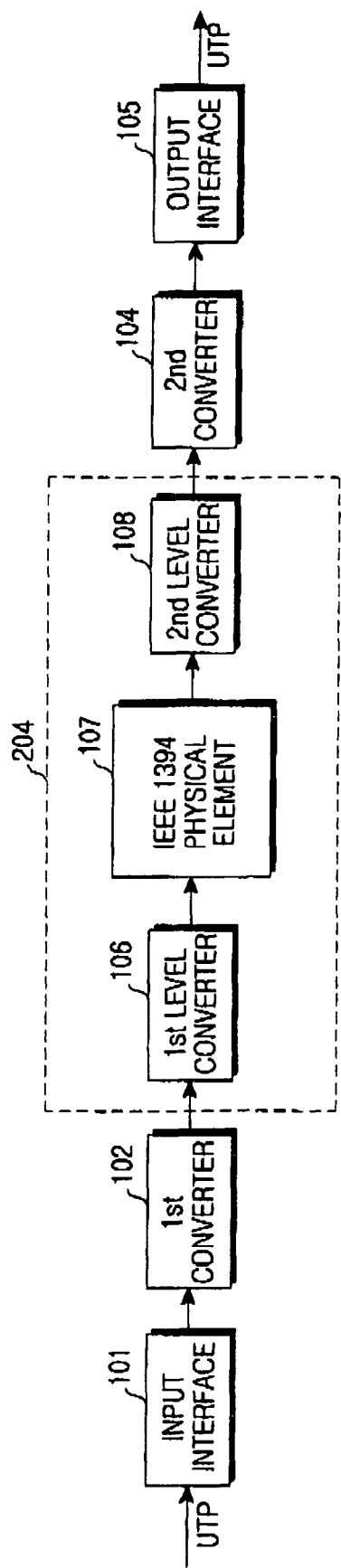

Hereinafter, embodiments of the present invention will be described with reference to the accompanying drawings. In the following description, the same or similar elements will be designated by the same reference numerals although they are shown in different drawings. For the purposes of clarity and simplicity, a detailed description of known functions and configurations incorporated herein will be omitted as it may make the subject matter of the present invention unclear.

Figure 2:
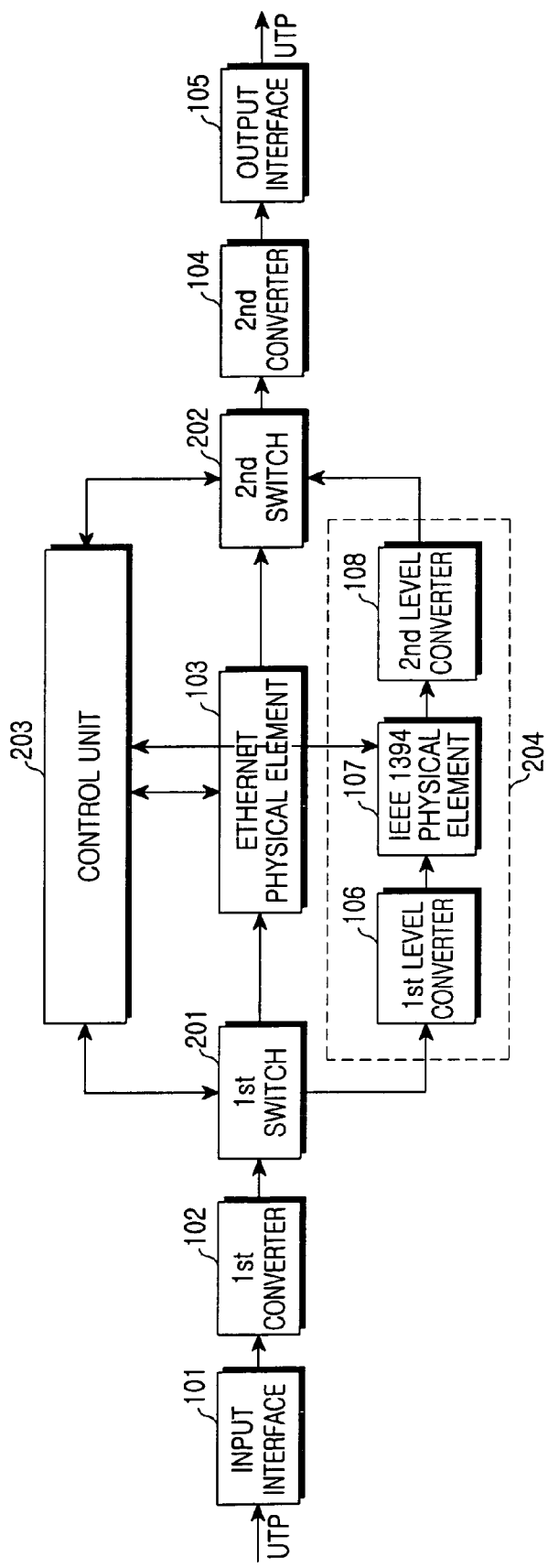
FIG. 2 illustrates the structure of an Ethernet-IEEE 1394 repeater capable of recognizing and automatically converting an Ethernet protocol and an IEEE 1394 protocol according to the first embodiment of the present invention.

FIG. 2 illustrates the structure of an Ethernet-IEEE 1394 repeater capable of recognizing and automatically converting an Ethernet protocol and an IEEE 1394 protocol according to a first embodiment of the present invention.

As shown in FIG. 2, the Ethernet-IEEE 1394 repeater of the first embodiment of the present invention includes an input interface 101 for receiving data through an UTP, an Ethernet physical element 103 for performing modulation/demodulation processes for modulating/demodulating an Ethernet data to be properly transmitted, an IEEE 1394 physical unit 204 for performing modulation/demodulation processes for modulating/demodulating an IEEE 1394 data to be properly transmitted, an output interface 105 for outputting data through the UTP, a first switch 201 for switching data input to the input interface 101 to the Ethernet physical element 103 or the IEEE 1394 physical unit 204, a second switch 201, tuned with the first switch 210, for switching an output path with respect to the Ethernet physical element 103 or an IEEE 1394 physical unit 204, and a control unit 203 for controlling the first switch 201 and the second switch 202 based on a protocol information of data input from the Ethernet physical element 103 or the IEEE 1394 physical unit 204 which is selectively connected according to a current switching condition.

If an abnormal voltage occurs in the transmission media, the internal chips such as the IEEE 1394 physical unit 204, etc. may be damaged by the applied abnormal voltage. In order to prevent such a possible damage caused by the abnormal voltage, the first converter 102 is connected between the input interface 101 and the first switch 201 and the second converter 104 are connected between the output interface 105 and the second switch 202 to isolate the IEEE 1394 physical unit 204 from the transmission media.

The IEEE 1394 physical unit 204 includes a first level converter 106, a second level converter 108, and an IEEE 1394 physical element 107 which performs modulation and demodulation processes of the IEEE 1394 data to be transmitted. The modulation and the demodulation processes are basic performances of the IEEE 1394 physical unit 204. The first level converter 106 and the second level converter 108 convert signal voltage levels based on the variation of the transmission media. Specifically, the IEEE 1394 may use STP, UTP, or Optical fiber for its transmission media. The signals, which input and output to and from the physical element vary in the signal voltage level in accordance with the transmission media types. More specifically, the signal voltage levels of the STP and the optical fiber are not identical to that of the UTP. Generally, the IEEE 1394 physical element 107 uses a signal voltage for the STP and the optical fiber. Therefore, if the UTP is used for the IEEE 1394 physical element 107, then it is required to change the used signal voltage level. For this operation, the first level converter 106 and the second level converter 108 are necessary to convert or change the input and the output signal voltage levels.

The first switch 201 and the second switch 202 are tuned with each other and maintained in a predetermined default switch condition. In this case, it is assumed that the Ethernet physical element 103 is connected in the default condition.

The input interface 101 receives data through the UTP, and sends the received data (input data) to the first switch 201 via the first converter 102. At this time, the first switch 201 setups a path through which the input data are transferred to the Ethernet physical element 103. Then, the Ethernet physical element 103 performs data modulation/demodulation processes for sending an Ethernet transmission signal. Also, the Ethernet physical element 103 determines if state information of the input data such as "Node ID", Node count", Speed" and "Link On" in a register are normal to confirm whether or not the input data are the Ethernet data based on the determination result. For example, if the "Node count" is more than one (1), then the input data would be the Ethernet frame, whereas if the "Node count" is 0, then the input data would not be the Ethernet frame.

The Ethernet physical element 103 sends the state information of the input data to the control unit 203 to notify whether or not the received data (or input data) are normal Ethernet data. If the received data is normal Ethernet data, the control unit 203 maintains current connection condition, whereas the received data is not normal Ethernet data, then the control unit 203 estimates that the received data should be IEEE 1394 data, and controls the first switch 201 and the second switch 202 to setup a path through which the received data are transferred to the IEEE 1394 physical unit 204.

Even in case that the path, through which the data are transferred to the IEEE 1394 physical unit 204, has been setup, the control unit 203 can determine if the state information input into the register of the IEEE 1394 physical element 107 of the IEEE 1394 physical unit 204 is normal or abnormal to confirm whether or not the input data are IEEE 1394 data based on the determination. The state information includes, for example, "Node ID", "Node Count", Speed", "Link On", etc as mentioned above.

The IEEE 1394 physical unit 107 transfers such a received state information to the control unit 203 to notify the corresponding data is normal or abnormal. If the corresponding data is normal IEEE 1394 data, the control unit 203 maintains the current connection condition, whereas if the corresponding data is not normal IEEE 1394 data, then the control unit 203 estimates the corresponding data should be Ethernet data, and controls the first switch 201 and the second switch 202 to setup a path through which the corresponding data are transferred to the Ethernet physical element 103.

Figure 3:
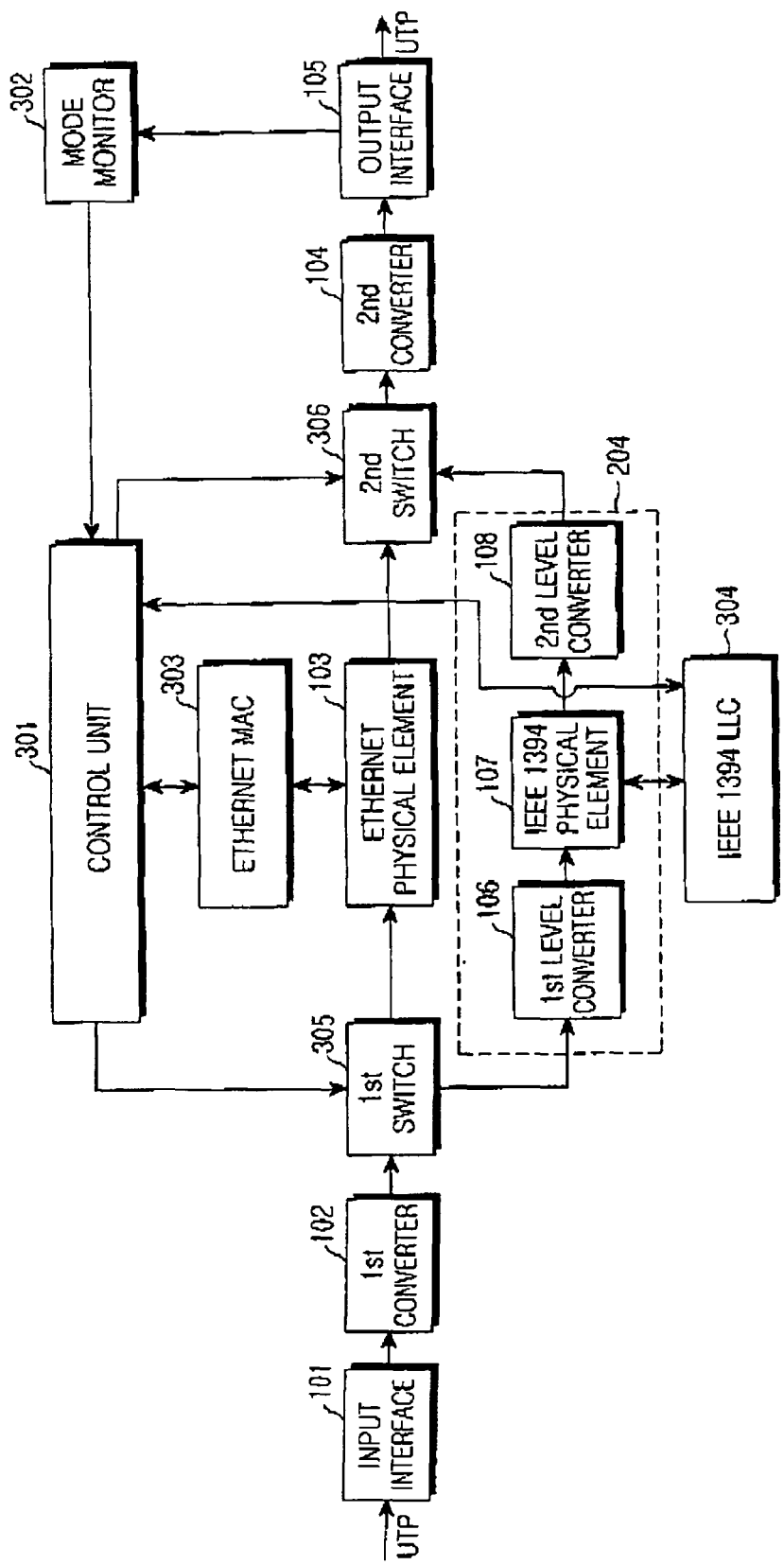
FIG. 3 illustrates the structure of an Ethernet-IEEE 1394 repeater capable of recognizing an Ethernet protocol and an IEEE 1394 protocol, and automatically converting an input protocol based on an output protocol according to the second embodiment of the present invention.

FIG. 3 illustrates a structure of an Ethernet-IEEE 1394 repeater capable of recognizing an Ethernet protocol and an IEEE 1394 protocol, and automatically converting an input protocol based on an output protocol according to a second embodiment of the present invention.

As shown in FIG. 3, the Ethernet-IEEE 1394 repeater of the second embodiment of the present invention includes an input interface 101 for receiving data through an UTP, an Ethernet physical element 103 for performing modulation/demodulation processes for modulating/demodulating an Ethernet data to be properly transmitted, an IEEE 1394 physical unit 204 for performing modulation/demodulation processes for modulating/demodulating an IEEE 1394 data to be properly transmitted, a first switch 305 for switching data input to the input interface 101 to the Ethernet physical element 103 or the IEEE 1394 physical unit 204, a second switch 307 for switching an output path with respect to the Ethernet physical element 103 or an IEEE 1394 physical unit 204 based on the controlling of the control unit 301, an Ethernet MAC 303, connected to the Ethernet physical element 103, for decapsulating an Ethernet frame sent from the Ethernet physical element 103, sending the decapsulated Ethernet frame to the control unit 301, capsulating data sent from the control unit 301, generating an Ethernet frame based on the capsulated data and sending the generated Ethernet frame to the Ethernet physical element 103, an IEEE 1394 LLC 304, connected to the IEEE 1394 physical unit 204, for decapsulating an IEEE 1394 frame sent from the IEEE 1394 physical unit 204, sending the decapsulated IEEE 1394 frame to the control unit 301, capsulating data sent from the control unit 301, generating an IEEE 1394 frame based on the capsulated data and sending the generated IEEE 1394 frame to the IEEE 1394 physical unit 204, a mode monitor 302, connected to an output interface 105, for monitoring protocols of transmission media connected to the output interface and sending the monitored protocols to the control unit 301, and control unit 301 for receiving data protocol information sent from the Ethernet physical element 103 or from the IEEE 1394 physical unit 204, and controlling the first switch 305 and the second switch 306 based on the monitored protocol of the transmission media connected to the output interface. The monitored protocol is monitored by the mode monitor 302.

Further, if an abnormal voltage occurs in the transmission media, the internal chips such as the IEEE 1394 physical unit 204, etc. may be damaged by the applied abnormal voltage. In order to prevent possible damage caused by the abnormal voltage, the Ethernet-IEEE 1394 repeater includes a first converter 102 and a second converter 104 for isolating IEEE 1394 physical unit 204 from the transmission media. Thus, the first converter 102 is connected between the input interface 101 and the first switch 305, and the second converter 104 is connected between the output interface 105 and the second switch 306.

The IEEE 1394 physical unit 204 includes a first level converter 106 and a second level converter 108, an IEEE 1394 physical element 107 which performs modulation and demodulation processes of the IEEE 1394 data to be transmitted. The modulation and the demodulation processes are basic performances of the IEEE 1394 physical unit 204. The first level converter 106 and the second level converter 108 convert signal voltage levels based on the variation of transmission media. Specifically, the IEEE 1394 may use STP, UTP, or Optical fiber for its transmission media. The signals, which input and output to and from the physical element vary in the signal voltage level in accordance with the transmission media types. More specifically, the signal voltage levels of the STP and the optical fiber are not identical to that of the UTP. Generally, the IEEE 1394 physical element 107 uses a signal voltage for the STP and the optical fiber. Therefore, if the UTP is used for the IEEE 1394 physical element 107, then it is required to change the used signal voltage level. For this operation, the first level converter 106 and the second level converter 108 are necessary to convert or change the input and the output signal voltage levels.

More specifically, the first switch 305 and the second switch 306 are operated based on the controlling of the control unit 301, and maintained in a predetermined default switch condition. In this case, it is assumed that the Ethernet physical element 103 is connected in the default condition.

The input interface 101 receives data through the UTP, and sends the received data (input data) to the first switch 305 via the first converter 102. At this time, the first switch 305 setups a path through which the input data are transferred to the Ethernet physical element 103. Then, the Ethernet physical element 103 performs data modulation/demodulation processes for making Ethernet transmission. Also, the Ethernet physical element 103 determines if state information of the received data such as "Node ID", Node Count", "Speed" and "Link On" in a register are normal such that it can be confirmed whether or not the received data are the Ethernet data or not based on the determination result. For example, if the "Node count" is more than one (1), then the received data would be the Ethernet frame, whereas if the "Node count" is 0, then the received data would not be the Ethernet frame.

The Ethernet physical element 103 sends the state information of the received data to the control unit 301 to notify whether or not the received data are normal Ethernet data. At this time, the control unit 301 has already recognized the protocol information of the transmission media connected to the output interface 105 by the aid of the mode monitor 302 connected to the output interface 105. Therefore, if the transmission protocol of the output side is Ethernet, the control unit 203 maintains a current connection condition. Specifically, both the first switch and the second switch are all connected to the Ethernet physical element 103. Whereas if the transmission protocol of the output side is IEEE 1394, then the control unit 301 directs the Ethernet MAC 303 to decapsulate the Ethernet frame and send the decapsulated Ethernet frame to the IEEE 1394 LLC 304 which then generates the IEEE 1394 frame based on the Ethernet frame to connect the generated IEEE 1394 frame to the second switch 306 via the IEEE 1394 physical unit 204. More specifically, the first switch 305 is connected to the Ethernet physical element 103 and the second switch 306 is connected to the IEEE physical unit 204.

Even in the case that the path, through which the data are transferred to the IEEE 1394 physical unit 204, has been setup, the control unit 301 can determine if the state information input into the register of the IEEE 1394 physical element 107 of the IEEE 1394 physical unit 204 is normal or abnormal to confirm whether or not the input data are IEEE 1394 data based on the determination. The state information includes, for example, "Node ID", "Node Count", Speed", "Link On", etc as mentioned above.

When receiving the IEEE 1394 data, the IEEE 1394 physical unit 204 transfers the state information of the received data to the control unit 301 to notify whether the corresponding received data is normal or abnormal IEEE 1394 data. At this time, the control unit 301 has already recognized the protocol information of the transmission media connected to the output interface 105 by the aid of the mode monitor 302 connected to the output interface 105. Therefore, if the transmission protocol of the output side is IEEE 1394, the control unit 203 maintains current connection condition. Specifically, both the first switch and the second switch are all connected to the IEEE 1394 physical unit 204. Whereas if the transmission protocol of the output side is Ethernet, then the control unit 301 directs the IEEE 1394 LLC 304 to decapsulate the IEEE frame and send the decapsulated IEEE frame to the Ethernet MAC 303 which then generates the Ethernet frame based on the IEEE frame to connect the generated IEEE 1394 frame to the second switch 306 via the Ethernet physical element 103. More specifically, the first switch 305 is connected to the IEEE physical unit 204 and the second switch 306 is connected to the Ethernet element 103.

In the above embodiments of the present invention, the IEEE 1394 data are, by example, asynchronous data excluding isochronous data. Therefore, if the input signal is the isochronous data such as a realtime broadcasting data, the corresponding output protocol should be limited to the IEEE 1394. Specifically, the asynchronous data such as internet data should not be transmitted directly to the Ethernet MAC or the IEEE 1394 LLC. More specifically, the asynchronous data such as internet data should be transmitted to the Ethernet MAC or the IEEE 1394 LLC, essentially via the control unit 301, whereas the isochronous data may be transmitted directly to the IEEE 1394 LLC.

According to the second embodiment of FIG. 3, there are four cases for transmitting the output signal in response to the input signals. Specifically, there are cases of the identical input and output signal, and of non-identical input and output signals. The first embodiment of the present invention corresponds to the identical input and output case.

Further, the non-identical cases can be classified again into two cases. One is that the input signal corresponds to an Ethernet frame and the output signal corresponds to an IEEE 1304 packet. Another is that the input signal corresponds to the IEEE 1394 packet and the output corresponds to the Ethernet frame. In this case, the Ethernet frame should be converted to the IEEE 1394 packet by performing protocol conversion function.

Figure 4:
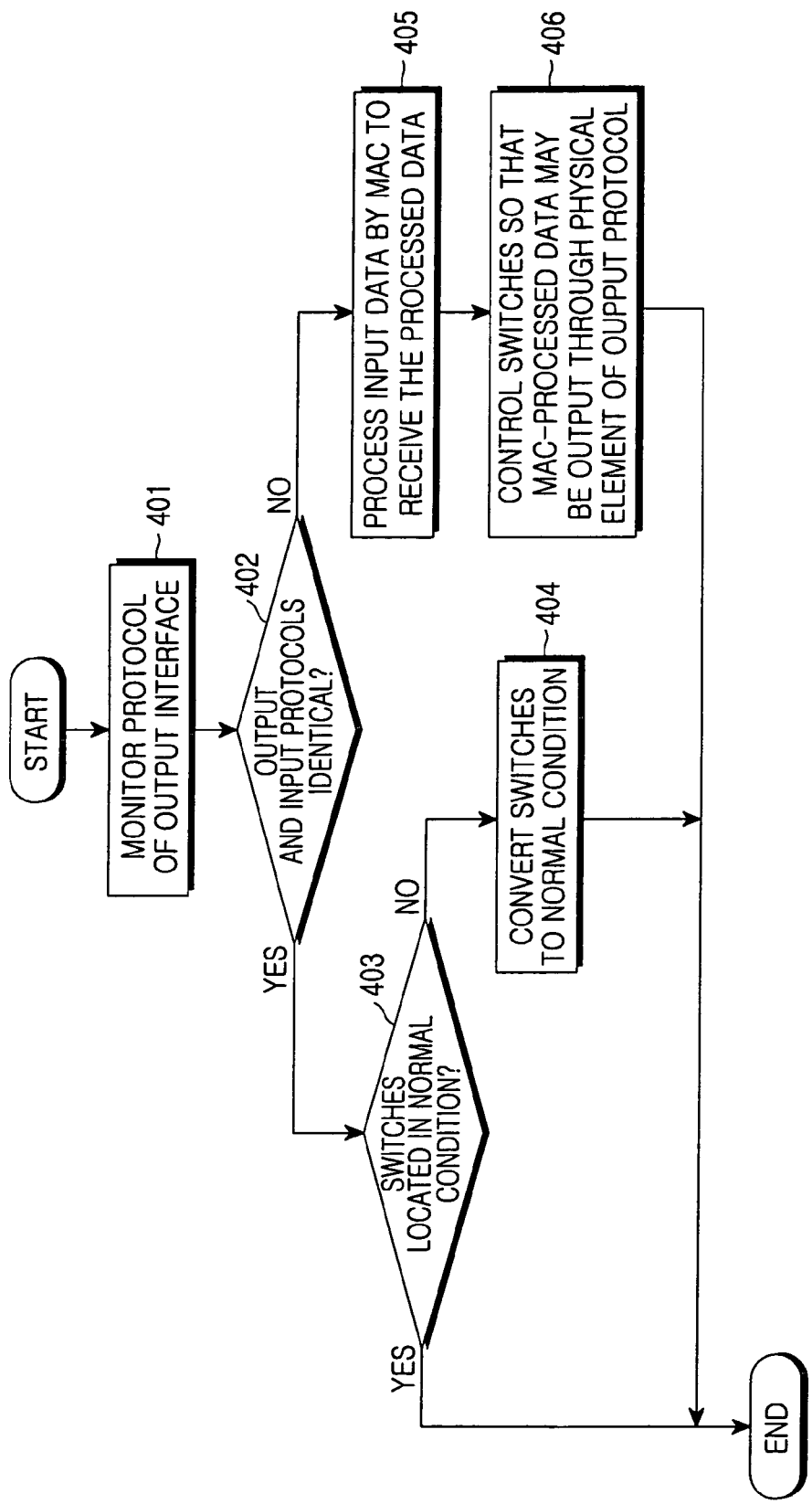
FIG. 4 is a flow chart showing a protocol conversion in a control unit according to the second embodiment of the present invention.

FIG. 4 is a flow chart illustrating the operation steps for controlling protocol conversion in the control unit according to the second embodiment of the present invention.

First, in step 401, the control unit 301 monitors a protocol used in the transmission media connected to the output interface. In this case, the protocol may be detected based on ACK signals which vary according to the kinds of the protocols. As this process is well-known in the ordinary skill in the art, the discussion will be omitted for simplicity.

Next, in step 402, the control unit 301 determines if the monitored output protocol and the monitored input protocol are identical.

If the input and the output protocols are identical in step 402, then the process goes to step 403 wherein the control unit 301 determines if input switch and output switch are connected to corresponding physical element for properly processing the corresponding protocol. If the switches are properly located (i.e., properly connected to the corresponding physical element for processing the corresponding protocols) in step 403, then the current connection condition is maintained. If the switches are not properly located (i.e., not properly connected to the corresponding physical element for processing the corresponding protocols) in step 403, then the control unit 301 properly connects the switches to the corresponding physical element in step 404.

If the input and the output protocols are not identical in step 402, then the current input switch is connected to the physical element to process the input data in a physical layer. The input data processed in the physical layer are again processed by MAC and decapsulation processes such that the processed data is received in step 405. Next, in step 406, the MAC-processed data is connected to an output protocol MAC element to capsulate the data with the corresponding output protocol which then are transferred to the output transmission media via the physical element and the output switch, in accordance with the control of the control unit 301.

As mentioned above, the present invention integrates the Ethernet repeater with the IEEE 1394 repeater such that the economical and the spatial saves can be obtained. Further, according to the present invention, various input protocols can be recognized and automatically switched to consequently and properly process the corresponding protocols. Note that the method according to the present invention mentioned above can be embodied by a program which can be stored in the form of readably-recorded-media (for example, CD ROM, RAM, floppy disk, hard disk, optical or magnetic disk, etc.).

While the invention has been shown and described with reference to certain preferred embodiments thereof, it will be understood by those skilled in the art that various changes in form and details may be made therein without departing from the spirit and scope of the invention. Accordingly, the scope of the present invention should not be defined by the above embodiments and the attached drawings.

What is claimed is:

1. A repeater apparatus for supporting a plurality of protocol including a first protocol and a second protocol using a common transmission media, the repeater apparatus comprising:

an input interface through which data are input from an input transmission media;

a first protocol physical element for performing modulation/demodulation of a first protocol data, the first protocol being an Ethernet protocol, the first protocol element comprising:

an Ethernet physical element, coupled to a first switch and a second switch, for performing modulation/demodulation of the Ethernet data to be transmitted; and an Ethernet MAC, coupled to the Ethernet physical element, for decapsulating Ethernet frames transmitted from the Ethernet physical element, sending the decapsulated Ethernet frames to a control unit, capsulating data sent from the control unit, generating Ethernet frames based on the capsulated data, and sending the generated Ethernet frame to the Ethernet physical element;

a second protocol physical element for performing modulation/demodulation processes of a second protocol data;

an output interface for outputting the data through to an output transmission media;

the first switch for switching the data input to the input interface to one of the first protocol physical element and the second protocol physical element;

the second switch, tuned with the first switch, for switching an output path corresponding to said one of the first protocol physical element and the second protocol physical element switched by said first switch to said data input, the output path being connected to the output interface; and the control unit for receiving a protocol information of data transmitted from one of the first protocol physical element and the second protocol physical element to control the first switch and the second switch based on the received protocol information, the first protocol physical element or the second protocol physical element being selectively connected between said input interface and said output interface based on a current switching condition of said first and second switches, wherein said control unit maintains said current switching condition when said protocol information supports media transmission by said current switching condition and alters said current switching condition to an opposing state when said protocol information fails to support media transmission by said current switching condition, wherein the control unit confirms an input protocol and an output protocol;

if the input protocol and the output protocol are not identical to each other, the control unit switches the first switch to an input protocol physical element corresponding to the input protocol, and the second switch to an output protocol physical element corresponding to the output protocol; and the control unit receives decapsulated data sent from the input protocol physical element and sends the received decapsulated data to the output protocol physical element to capsulate the decapsulated data into the data according to the output protocol.

2. The repeater apparatus as claimed in claim 1, wherein the second protocol is an IEEE 1394 protocol.

3. The repeater apparatus as claimed in claim 2, wherein the second protocol physical element includes:

a first level converter, coupled to the first switch, for converting signal voltage levels based on variation of the output transmission media in the IEEE 1394 protocol;

a second level converter, coupled to the second switch, for converting signal voltage levels based on variation of the output transmission media in the IEEE 1394 protocol; and an IEEE 1394 physical unit for performing modulation/demodulation processes of IEEE 1394 data to be transmitted and for transferring the processed data to the second level converter.

4. The repeater apparatus as claimed in claim 1, wherein the repeater apparatus further comprises:

a first converter coupled between the first switch and the input interface; and a second converter, coupled between the second switch and the output interface, wherein the first converter and the second converter prevent damages caused by abnormal voltages applied through the output transmission media.

5. The repeater apparatus as claimed in claim 4, wherein the control unit receives the protocol information of input data from a register of one of the first protocol physical element and the second protocol physical element and controls the first switch and the second switch based on the received protocol information to process the input data.

6. The repeater apparatus as claimed in claim 5, wherein the protocol information of the input data is "Node ID" information of the data.

7. The repeater apparatus as claimed in claim 5, wherein the protocol information of the input data is "Node count" information of the data.

8. The repeater apparatus as claimed in claim 5, wherein the protocol information of the input data is Speed information of the data.

9. The repeater apparatus as claimed in claim 5, wherein the protocol information of the input data is Link On information of the data.

10. A repeater apparatus for supporting a plurality of protocols including a first protocol and a second protocol using a common transmission media, the repeater apparatus comprising:

an input interface for inputting therein data through an input transmission media;

a first protocol element for processing a first protocol data, the first protocol being an Ethernet protocol, the first protocol element comprising:

an Ethernet physical element, coupled to a first switch and a second switch, for performing modulation/demodulation of the Ethernet data to be transmitted; and an Ethernet MAC, coupled to the Ethernet physical element, for decapsulating Ethernet frames transmitted from the Ethernet physical element, sending the decapsulated Ethernet frames to a control unit, capsulating data sent from the control unit, generating Ethernet frames based on the capsulated data, and sending the generated Ethernet frame to the Ethernet physical element;

a second protocol element for processing a second protocol data;

an output interface for outputting the data through an output transmission media;

the first switch for switching the data input to the input interface to one of the first protocol element and the second protocol element;

the second switch for switching said one of the first protocol element and the second protocol element switched to said data input by said first switch to an output path of said corresponding one of the first protocol element and the second protocol element, wherein the output path is coupled to the output interface;

a mode monitor, coupled to the output interface, for monitoring an output protocol used in the output transmission media; and the control unit for:

receiving a protocol information of input data sent from one of the first protocol element and the second protocol element, confirming an input protocol based on the protocol information of the input data, and confirming the output protocol monitored by the mode monitor to control the first switch and the second switch based on the first and the second protocol data, wherein if said protocol information supports media transmission by current switching condition, maintaining said current switching condition, otherwise, altering said current switching condition to an opposing state when said protocol information fails to support media transmission by said current switching condition;

wherein if the input protocol and the output protocol are not identical to each other, the control unit performs a protocol conversion control;

the control unit confirms the input protocol and the output protocol;

if the input protocol and the output protocol are not identical to each other, the control unit switches the first switch to an input protocol physical element corresponding to the input protocol, and the second switch to an output protocol physical element corresponding to the output protocol; and the control unit receives decapsulated data sent from the input protocol physical element and sends the received decapsulated data to the output protocol physical element to capsulate the decapsulated data into the data according to the output protocol.

11. The repeater apparatus as claimed in claim 10, wherein the second protocol is an IEEE 1394 protocol.

12. The repeater apparatus as claimed in claim 11, wherein the second protocol element includes:

a first level converter, coupled to the first switch, for converting signal voltage levels based on variation of the output transmission media in the IEEE 1394 protocol;

a second level converter, coupled to the second switch, for converting signal voltage levels based on variation of the output transmission media in the IEEE 1394 protocol;

an IEEE 1394 physical element for performing an IEEE 1394 modulation/demodulation processes of data sent from the first level converter, and transferring the processed data to the second level converter; and an IEEE 1394 LLC, coupled to the IEEE 1394 physical element, for decapsulating IEEE 1394 frames sent from the IEEE physical element, sending the decapsulated IEEE 1394 frames to the control unit, capsulating data sent from the control unit, generating IEEE 1394 packet based on the capsulated data, and sending the IEEE 1394 packet to the IEEE 1394 physical element.

13. The repeater apparatus as claimed in claim 10, wherein the repeater apparatus further comprise:

a first converter coupled between the first switch and the input interface; and a second converter, coupled between the second switch and the output interface, wherein the first converter and the second converter prevent damages caused by abnormal voltages applied through the output transmission media.

14. The repeater apparatus as claimed in claim 13, if the input protocol and the output protocol are identical to each other, then the control unit switches the first switch and the second switch to the protocol physical element corresponding to the identical protocol.

15. The repeater apparatus as claimed in claim 13, wherein in order to confirm the input protocol, the control unit receives the protocol information of input data from a register of one of the first protocol element and the second protocol element.

16. The repeater apparatus as claimed in claim 15, wherein the protocol information of the input data is "Node ID" information of the data.

17. The repeater apparatus as claimed in claim 15, wherein the protocol information of the input data is "Node count" information of the data.

18. The repeater apparatus as claimed in claim 15, wherein the protocol information of the input data is Speed information of the data.

19. The repeater apparatus as claimed in claim 15, wherein the protocol information of the input data is Link On information of the data.

20. A repeater apparatus for supporting a plurality of protocols including a first protocol and a second protocol using a common transmission media, the repeater apparatus comprising:
an input interface for inputting therein data through an input transmission media;
a first protocol element for processing a first protocol data;
a second protocol element for processing a second protocol data, the second protocol being an IEEE 1394 protocol, wherein the second protocol element comprises:
a first level converter, coupled to a first switch, for converting signal voltage levels based on variation of the input transmission media in the IEEE 1394 protocol;
a second level converter, coupled to a second switch, for converting signal voltage levels based on variation of a transmission media in the IEEE 1394 protocol;
an IEEE 1394 physical element for performing an IEEE 1394 modulation/demodulation processes of data sent from the first level converter, and transferring the processed data to the second level converter; and
an IEEE 1394 LLC, coupled to the IEEE 1394 physical element, for decapsulating IEEE 1394 frames sent from the IEEE physical element, sending the decapsulated IEEE 1394 frames to a control unit, capsulating data sent from the control unit, generating IEEE 1394 packet based on the capsulated data, and sending the IEEE 1394 packet to the IEEE 1394 physical element;
an output interface for outputting the data through an output transmission media;
the first switch for switching the data input to the input interface to one of the first protocol element and the second protocol element;
the second switch for switching said one of the first protocol element and the second protocol element switched to said data input by said first switch, to an output path of said corresponding one of the first protocol element and the second protocol element, wherein the output path is coupled to the output interface;
a mode monitor, coupled to the output interface, for monitoring an output protocol used in the output transmission media; and
the control unit for:
receiving a protocol information of input data sent from one of the first protocol element and the second protocol element,
confirming an input protocol based on the protocol information of the input data, and confirming the output protocol monitored by the mode monitor to control the first switch and the second switch based on the received protocol information, wherein if said protocol information supports media transmission by current switching condition, maintaining said current switching condition, otherwise, altering said current switching condition to an opposing state when said protocol information fails to support media transmission by said current switching condition;
wherein if the input protocol and the output protocol are not identical to each other, the control unit performs a protocol conversion control;
the control unit confirms the input protocol and the output protocol;
if the input protocol and the output protocol are not identical to each other, the control unit switches the first switch to an input protocol physical element corresponding to the input protocol, and the second switch to an output protocol physical element corresponding to the output protocol; and
the control unit receives decapsulated data sent from the input protocol physical element and sends the received decapsulated data to the output protocol physical element to capsulate the decapsulated data into the data according to the output protocol.

21. The apparatus of claim 20, wherein the first protocol is an Ethernet protocol.

22. The apparatus of claim 21, wherein the first protocol element comprising:
an Ethernet physical element, coupled to the first switch and the second switch, for performing modulation/demodulation of the Ethernet data to be transmitted; and
an Ethernet MAC, coupled to the Ethernet physical element, for decapsulating Ethernet frames transmitted from the Ethernet physical element, sending the decapsulated Ethernet frames to the control unit, capsulating data sent from the control unit, generating Ethernet frames based on the capsulated data, and sending the generated Ethernet frame to the Ethernet physical element.

* * * * *